(12) United States Patent
Wang

(10) Patent No.: US 12,700,643 B2
(45) Date of Patent: Aug. 4, 2026

(54) ELECTROCHEMICAL DEVICE AND ELECTRONIC DEVICE CONTAINING SAME

(71) Applicant: Ningde Amperex Technology Limited, Ningde City (CN)

(72) Inventor: Rui Wang, Ningde (CN)

(73) Assignee: NINGDE AMPEREX TECHNOLOGY LIMITED, Ningde City (CN)

( * ) Notice: Subject to any disclaimer, the term of this patent is extended or adjusted under 35 U.S.C. 154(b) by 812 days.

(21) Appl. No.: 17/707,584

(22) Filed: Mar. 29, 2022

(65) Prior Publication Data

US 2022/0223975 A1 Jul. 14, 2022

Related U.S. Application Data

(63) Continuation of application No. PCT/CN2019/130067, filed on Dec. 30, 2019.

(51) Int. Cl.
*H01M 50/446* (2021.01)
*H01M 4/02* (2006.01)
(Continued)

(52) U.S. Cl.
CPC ......... *H01M 50/446* (2021.01); *H01M 4/386* (2013.01); *H01M 4/387* (2013.01);
(Continued)

(58) Field of Classification Search
CPC ......... H01M 4/133–134; H01M 4/1393–1395; H01M 4/36; H01M 4/38;
(Continued)

(56) References Cited

U.S. PATENT DOCUMENTS

2008/0311472 A1* 12/2008 Yamaguchi ....... H01M 10/0569
29/623.5
2012/0219840 A1* 8/2012 Choi .................... H01M 4/364
429/217
(Continued)

FOREIGN PATENT DOCUMENTS

CN 101809784 A 8/2010
CN 101916837 A 12/2010
(Continued)

OTHER PUBLICATIONS

ISR for International Application PCT/CN2019/130067 mailed Sep. 25, 2020.
(Continued)

*Primary Examiner* — Nicole M. Buie-Hatcher
*Assistant Examiner* — Jacob Buchanan
(74) *Attorney, Agent, or Firm* — XSENSUS LLP

(57) ABSTRACT

An electrochemical device includes a positive electrode, a negative electrode, and a separator. The negative electrode includes a negative active material. The negative active material includes at least one of silicon, tin, germanium, antimony, bismuth, and aluminum. The separator includes a porous substrate and a coating. The coating is located between the porous substrate and the negative electrode, and the coating includes a polymer binder. Based on a total weight of the coating, a weight percent of the polymer binder is 1%-100%, and a ratio of a weight of the polymer binder in the coating per unit area to a specific capacity of a corresponding component of the negative electrode per unit area is 0.00013 mg/mAh-0.00045 mg/mAh.

20 Claims, 2 Drawing Sheets

(51) Int. Cl.

| | | |
|---|---|---|
| *H01M 4/38* | (2006.01) | |
| *H01M 4/62* | (2006.01) | |
| *H01M 50/46* | (2021.01) | |
| *H01M 50/491* | (2021.01) | |

(52) U.S. Cl.
CPC ......... *H01M 4/623* (2013.01); *H01M 50/461* (2021.01); *H01M 50/491* (2021.01); *H01M 2004/027* (2013.01)

(58) Field of Classification Search
CPC ... H01M 4/386–387; H01M 10/00–04; H01M 10/05–0525; H01M 10/056; H01M 50/40–426; H01M 50/431–434; H01M 50/446–457; H01M 4/02; H01M 4/621–623; H01M 50/46–461; H01M 50/489–497
See application file for complete search history.

(56) References Cited

U.S. PATENT DOCUMENTS

2013/0164618 A1* 6/2013 Konishi ............... H01M 4/623
429/217

2013/0236765 A1* 9/2013 Zhang ............... H01M 10/0565
429/144
2015/0303450 A1* 10/2015 Miki ..................... H01M 4/134
429/217

FOREIGN PATENT DOCUMENTS

| | | |
|---|---|---|
| CN | 102610773 A | 7/2012 |
| CN | 102779963 A | 11/2012 |
| CN | 104350631 A | 2/2015 |
| CN | 105591055 A | 5/2016 |
| CN | 105914322 A | 8/2016 |
| CN | 106058126 A | 10/2016 |
| CN | 107611314 A | 1/2018 |
| CN | 107836049 A | 3/2018 |
| CN | 108832061 A | 11/2018 |
| CN | 109244332 A | 1/2019 |
| CN | 109792089 A | 5/2019 |
| CN | 109830638 A | 5/2019 |
| JP | 2016072142 A | 5/2016 |

OTHER PUBLICATIONS

Chinese OA1 for Counterpart Application 201911397733-2 mailed Jan. 12, 2022.

* cited by examiner

ELECTROCHEMICAL DEVICE AND ELECTRONIC DEVICE CONTAINING SAME

CROSS REFERENCE TO THE RELATED APPLICATION

The present application is a continuation of International Patent Application No. PCT/CN2019/130067, filed on Dec. 30, 2019, the disclosure of which is hereby incorporated by reference in its entirety.

TECHNICAL FIELD

This application relates to the technical field to energy storage, and in particular, to a negative electrode, a separator, an electrochemical device containing the negative electrode and the separator, and an electronic device.

BACKGROUND

With rapid development of mobile electronic technologies, people are using a mobile electronic device such as a smartphone, a tablet computer, a notebook computer, an unmanned aerial vehicle, and various wearable devices more often and people's experience requirements are increasingly higher. Therefore, an electrochemical device (such as a lithium-ion battery) that provides energy for the electronic device needs to provide a higher energy density, a higher C-rate, higher safety, and less fading of specific capacity that occurs after repeated charge and discharge processes.

The life and efficacy of a lithium-ion battery are closely related to stability of its cells. Therefore, people carry out ongoing research and improvement on the suppression of expansion of a negative active material. The prior art mostly adjusts a composition of the negative active material or a structure of a negative electrode to solve the expansion problem of the negative active material. In addition to seeking a new negative active material, researching new types of separator materials or improving and optimizing the material composition of the separator is also one of the solutions.

SUMMARY

This application provides a separator, an electrochemical device containing the separator, and an electronic device in an attempt to solve at least one problem in the related art to at least some extent.

According to an aspect of this application, this application provides an electrochemical device. The electrochemical device includes a positive electrode, a negative electrode, and a separator. The negative electrode includes a negative active material. The negative active material includes at least one of silicon, tin, germanium, antimony, bismuth, and aluminum. The separator includes a porous substrate and a coating. The coating is located between the porous substrate and the negative electrode, and the coating includes a polymer binder. Based on a total weight of the coating, a weight percent of the polymer binder is 1%-100%, and a ratio of a weight of the polymer binder in the coating per unit area to a specific capacity of a corresponding component of the negative electrode per unit area is 0.00013 mg/mAh-0.00045 mg/mAh.

This application increases adhesion of the binder by controlling the ratio of the weight of the applied binder of the negative electrode per unit area to the specific capacity, thereby effectively avoiding deformation of a cell caused by volume expansion of the negative electrode during charging and discharging.

According to another aspect of this application, this application provides an electronic device. The electronic device includes the electrochemical device.

Additional aspects and advantages of the embodiments of this application will be described or illustrated in part later herein or expounded through implementation of the embodiments of this application.

BRIEF DESCRIPTION OF DRAWINGS

For ease of describing the embodiments of this application, the following outlines the drawings necessary for describing the embodiments of this application or the prior art. Apparently, the drawings outlined below are only a part of embodiments in this application. Without making any creative efforts, a person skilled in the art can still obtain the drawings of other embodiments according to the structures illustrated in these drawings.

DETAILED DESCRIPTION

Figure 1:
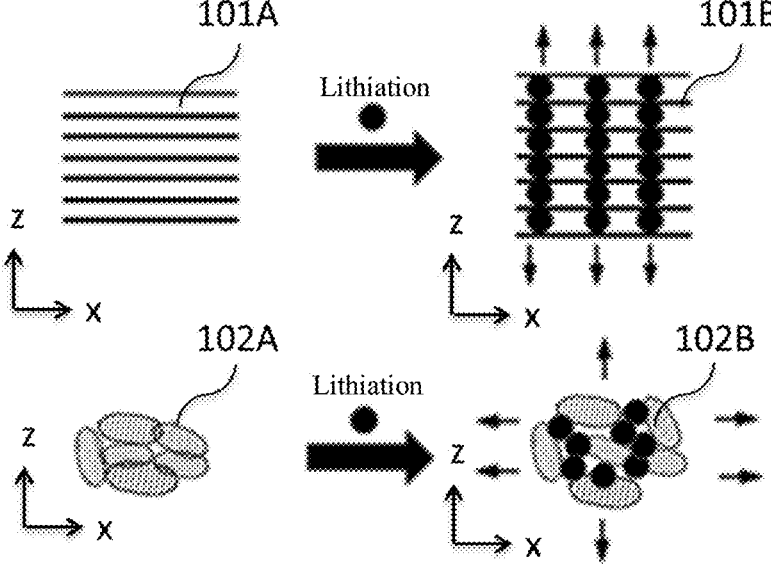
FIG. 1 is a schematic diagram of comparison of expansion between graphite and lithiated silicon.

Embodiments of this application will be described in detail below. Throughout the specification of this application, the same or similar components and the components having the same or similar functions are denoted by similar reference numerals. The embodiments described herein with reference to the accompanying drawings are illustrative and graphical in nature, and are intended to enable a basic understanding of this application. The embodiments of this application shall not be construed as a limitation on this application.

The terms "roughly," "substantially," "substantively", and "approximately" used herein are intended to describe and represent small variations. When used with reference to an event or situation, the terms may denote an example in which the event or situation occurs exactly and an example in which the event or situation occurs very approximately. For example, when used together with a numerical value, the term may represent a variation range falling within ±10% of the numerical value, such as ±5%, ±4%, ±3%, ±2%, ±1%, ±0.5%, ±0.1%, or ±0.05% of the numerical value. For example, if a difference between two numerical values falls within ±10% of an average of the numerical values (such as ±5%, ±4%, ±3%, ±2%, ±1%, ±0.5%, ±0.1%, or ±0.05% of the average), the two numerical values may be considered "substantially" the same.

In this specification, unless otherwise specified or defined, relativity terms such as "central", "longitudinal", "lateral", "front", "rear", "right" ",", "left", "internal", "external", "lower", "higher", "horizontal", "perpendicular", "higher than", "lower than", "above", "under", "top", "bottom", and derivative terms thereof (such as "horizontally", "downwardly", "upwardly") shall be interpreted as a direction described in the context or a direction illustrated in the drawings. The relativity terms are used for ease of description only, and do not require that the construction or operation of this application should be in a specific direction.

In addition, a quantity, a ratio, or another numerical value is sometimes expressed in a range format herein. Understandably, such a range format is for convenience and brevity, and shall be flexibly understood to include not only the numerical values explicitly specified and defined in the range, but also all individual numerical values or sub-ranges covered in the range as if each individual numerical value and each sub-range were explicitly specified.

In the description of embodiments and claims, a list of items referred to by using the terms such as "at least one of", "at least one thereof", "at least one type of" or other similar terms may mean any combination of the listed items. For example, if items A and B are listed, the phrases "at least one of A and B" and "at least one of A or B" mean: A alone; B alone; or both A and B. In another example, if items A, B, and C are listed, the phrases "at least one of A, B, and C" and "at least one of A, B, or C" mean: A alone; B alone; C alone; A and B (excluding C); A and C (excluding B); B and C (excluding A); or all of A, B, and C. The item A may include a single element or a plurality of elements. The item B may include a single element or a plurality of elements. The item C may include a single element or a plurality of elements.

In the prior art, to pursue a best energy density, attempts have been made to replace graphite in the conventional negative active material with a negative active material of a high energy density. However, in applying the negative active material of a high energy density, a large volume expansion during a charge and discharge cycle causes deformation of a cell, and is likely to disrupt a structure of the electrochemical device and reduce a service life of the electrochemical device. Especially for a lithium-ion battery, such an active material of a high energy density have a huge volume effect (>300%) in lithiation and delithiation processes. Severe expansion of the negative electrode may cause deformation of an interface between or even separation between the negative electrode and the separator, thereby deteriorating cycle performance of the lithium-ion battery. For example, as shown in FIG. 1, in the prior art, a cell containing a silicon negative electrode is prone to cause expansion of the negative electrode during cycling, and give rise to or widen a gap on the interface between the negative electrode and the separator. As can be observed through a CT scanner, sometimes the thickness of the cell increases by 10% or even more than 20%, and the gap between the separator and the negative electrode may reach approximately 30 μm to approximately 50 μm.

With a view to mitigating the expansion of the negative electrode, this application studies how to suppress cycle expansion of the negative electrode during charging by increasing interfacial adhesion of the separator to the negative electrode. This application provides a high-adhesion separator. The separator is applicable to a negative electrode containing a negative active material with a high energy density, such as simple substances, alloys or compounds of silicon, tin, germanium, antimony, bismuth, or aluminum. The separator produces high adhesion to the negative electrode, suppresses the expansion of the negative electrode by using a double binding effect generated by internal adhesion and external adhesion in the negative electrode, and effectively reduces a rebound rate and an expansion rate of the negative electrode, and thereby helping to reduce deformation of the cell. In addition, due to the suppression of expansion and deformation, the interface between the negative electrode and the separator is better, and the cycle capacity retention rate is higher. In addition, used together with such coating structure of the separator, an electrolytic solution can better infiltrate the separator according this application, thereby effectively avoiding purple specks of the negative electrode and decrease of the service life of the lithium-ion battery caused by insufficient infiltration of the electrolytic solution.

This application adopts a polymer coated separator (PCS), and adjusts interfacial adhesion of the separator to the negative electrode of the electrochemical device and reduces cycle expansion of the negative electrode by adjusting a coating percentage of a polymer binder contained in the coating of the separator.

Figure 2:
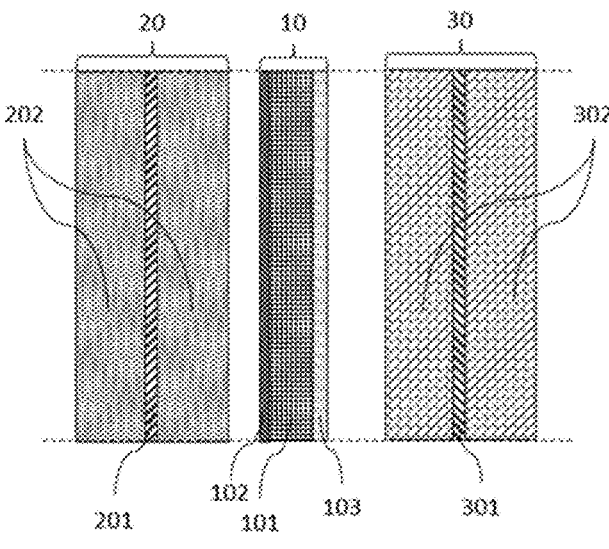
FIG. 2 is a schematic structural diagram of a positive electrode, a negative electrode, and a separator according to an embodiment of this application.

FIG. 2 is a schematic structural diagram of a positive electrode, a negative electrode, and a separator of an electrochemical device according to some embodiments of this application.

As shown in FIG. 2, this application provides an electrochemical device. The electrochemical device includes a separator 10, a negative electrode 20, and a positive electrode 30. The separator 10 is disposed between the negative electrode 20 and the positive electrode 30. The negative electrode 20 includes a negative current collector 201 and a negative active material layer 202. The negative active material layer includes a negative active material, and the negative active material includes at least one of silicon, tin, germanium, antimony, bismuth, and aluminum. In some embodiments, the separator 10 is a polymer coated separator (PCS). The separator 10 includes a porous substrate 101 and a coating 102. The coating 102 is located between the porous substrate 101 and the negative electrode 20, and the coating 102 includes a polymer binder. The porous substrate 101 includes a first surface and a second surface that is opposite to the first surface. The coating 102 is disposed on the first surface, and the negative electrode 20 is bonded to the coating 102 of the separator 10.

It is found in this application that, if interfacial adhesion of a functional coating of the separator is adjusted according to a specific capacity per unit area of the negative electrode, especially, if the weight of the applied polymer binder in the functional coating (coating 102) is adjusted, and, if the ratio of the weight (mg/mm$^2$) of the applied polymer binder per unit area to the specific capacity (mAh/mm$^2$) per unit area of the negative electrode is controlled within a specific ratio range, not only interfacial adhesion is sufficient to firmly adhere to the negative electrode, but also the volume expansion of the negative electrode is suppressed significantly during charge and discharge cycles. In addition, due to the suppression of expansion and deformation, the interface between the negative electrode and the separator is better, and the cycle capacity retention rate of the electrochemical device is higher. In addition, the percentage of the polymer binder in the coating according to the embodiments of this application also ensures that the pores of the porous substrate of the separator will not be excessively covered by the polymer binder of the coating, thereby increasing an ionic conductivity of the separator and cycle stability of the electrochemical device.

In some embodiments, a thickness of the coating is approximately 0.5 μm to approximately 5.0 μm. In other embodiments, roughly the thickness of the coating is, for example, approximately 0.5 μm, approximately 1.0 μm, approximately 1.5 μm, approximately 2.0 μm, approximately 3.0 μm, approximately 4.0 μm, approximately 5.0 μm, or a range formed by any two of such values.

In some embodiments, a porosity of the coating is approximately 20% to approximately 80%. In other embodiments, roughly the porosity of the coating is, for example, approximately 20%, approximately 30%, approximately 40%, approximately 50%, approximately 60%, approximately 70%, approximately 80%, or a range formed by any two of such values.

In some embodiments, a coverage of the coating on a first surface of the porous substrate is 20%-80%. The term "coverage" herein means an extent to which the coating covers a coated surface. For example, a coverage of 100% means that the coating fully covers the entire area of the coated surface. A coverage of 40% means that the coating covers merely 40% of the area of the coated surface, with the other 60% of the area of the coated surface being exposed.

The separator of the electrochemical device according to this application may be implemented in different manners depending on the negative active material of the negative electrode, the composition of the polymer binder of the coating, and the structural composition and material of the separator, as described below.

Negative Electrode

As shown in FIG. 2, the negative electrode 20 includes a negative current collector 201 and a negative active material layer 202. In some embodiments, the negative current collector 201 may be a copper foil or a nickel foil. However, other materials commonly used in the art may also be used as the negative current collector without limitation.

The negative active material layer 202 includes the negative active material capable of absorbing and releasing lithium (Li) (hereinafter sometimes referred to as "negative active material capable of absorbing/releasing lithium Li"). Examples of the material capable of absorbing/releasing lithium (Li) may include a carbon material, a metal compound, an oxide, a sulfide, a lithium nitride such as $LiN_3$, a lithium metal, a metal that combines with lithium into an alloy, and a polymer material. In some embodiments, among the materials capable of absorbing/releasing lithium (Li), examples of materials particularly having a high energy density include simple substances, alloys or compounds of silicon, tin, germanium, antimony, bismuth, and aluminum.

In some embodiments of this application, the negative active material includes at least one of simple substances, alloys or compounds of silicon, tin, germanium, antimony, bismuth, and aluminum.

For example, a theoretical specific capacity of silicon is up to 4,200 mAh/g, which is more than ten times that of a conventional graphite negative electrode (a theoretical specific capacity of graphite is 372 mAh/g). In some embodiments, the negative active material includes a silicon-based material. The silicon-based material includes simple-substance silicon, a silicon compound, a silicon alloy, or any combination thereof. The negative active material also includes a silicon oxide material $SiO_x$, where x=0.5-1.5. The silicon oxide material includes a crystalline material, a non-crystalline material, or a combination thereof.

In some embodiments, based on the total weight of the negative active material, a weight percent of such active component is greater than or equal to approximately 10% and less than approximately 100%. In other embodiments, based on the total weight of the negative active material, roughly the weight percent of the active component is, for example, approximately 10%, approximately 15%, approximately 20%, approximately 30%, approximately 40%, approximately 50%, approximately 60%, approximately 70%, approximately 80%, approximately 90%, approximately 100%, or a range formed by any two of such values.

Figure 3:
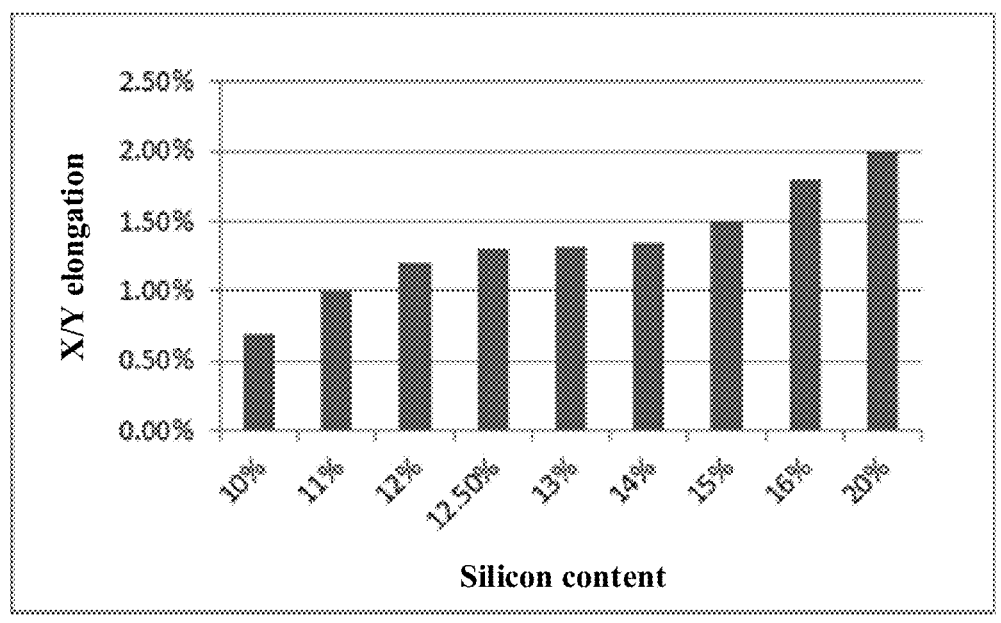
FIG. 3 is a bar graph of XY elongation values of negative active materials with different silicon contents and negative active material layers thereof and FIG. 4 is a bar graph of negative active materials with different silicon contents and theoretical specific capacities thereof.

FIG. 3 is a bar graph of XY elongation values of negative active materials with different silicon contents and negative active material layers thereof; and As shown in FIG. 3, the XY elongation value (volume expansion rate) of the negative active material layer increases with the increase of the percentage of the active component in the negative active material.

Figure 4:
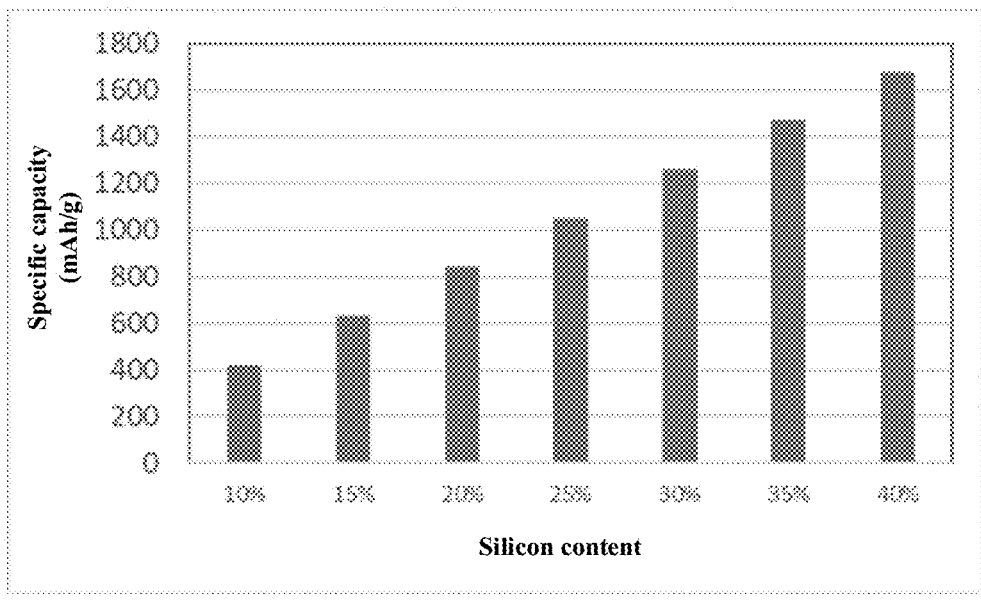

In some embodiments, a total specific capacity of the negative active material layer is approximately 300 mAh/g to approximately 3,250 mAh/g. Understandably, the specific capacity of the negative active material layer varies with the percentage of the active component. FIG. 4 is a bar graph of theoretical specific capacities of negative active materials with different silicon contents (10% to 40%). As shown in FIG. 4, in some embodiments, the specific capacity of the negative active material layer is approximately 400 mAh/g to approximately 1,600 mAh/g. In other embodiments, the specific capacity of the negative active material layer is roughly, for example, 500 mAh/g, 600 mAh/g, 700 mAh/g, 800 mAh/g, 900 mAh/g, 1,000 mAh/g, 1,200 mAh/g, 1,400 mAh/g, 1,500 mAh/g, 1,600 mAh/g, or a range formed by any two of such values. In some embodiments, the specific capacity of the negative active material layer is equal to 1,600 mAh/g.

In some embodiments, a compacted density of the negative active material layer is approximately 0.5 $g/cm^2$ to approximately 1.85 $g/cm^2$. In other embodiments, the compacted density of the negative active material layer is approximately 1.7 $g/cm^2$ to approximately 1.8 $g/cm^2$. In other embodiments, the compacted density of the negative active material layer is approximately 1.76 $g/cm^2$.

In some embodiments, the negative active material layer may include at least one additive. The additive may be at least one of a binder, a conductive agent, and/or a conventional negative electrode material additive in the art.

In some embodiments, the binder includes, or is selected from groups that include, a polyvinylidene fluoride, a vinylidene fluoride-hexafluoropropylene copolymer, a polyamide, a polyacrylonitrile, a polyacrylic ester, a polyacrylic acid, a sodium polyacrylate, a sodium carboxymethyl cellulose, a polyvinylpyrrolidone, a polyvinyl ether, a poly methyl methacrylate, a polytetrafluoroethylene, a poly-hexafluoropropylene, and styrene butadiene rubber. In some embodiments, the conductive agent includes, or is selected from groups that include, carbon nanotubes, carbon fiber, conductive carbon black, acetylene black, graphene, and Ketjen black. Understandably, a person skilled in the art may select a conventional binder and a conventional conductive agent according actual requirements without limitation.

In some embodiments, based on the total weight of the negative active material layer, the weight percent of the binder and the weight percent of the conductive agent each are approximately 0.1% to approximately 10.0% independently. In other embodiments, the weight percent of the binder and the weight percent of the conductive agent each are approximately 0.5% to approximately 5.0% independently.

Understandably, a person skilled in the art may select any conventional binder or conductive agent in the art or any negative electrode material additive known in the art according actual requirements without limitation.

Composition of the Polymer Binder in the Coating

By selecting the polymer binder in the coating, this application enhances the adhesion of the coating to the negative active material layer, and suppresses the expansion of the negative electrode by using a double binding effect generated by an internal binder and an external polymer binder in the negative electrode. For example, polyvinylidene fluoride (PVDF) can provide an adhesion force of more than 15 N/m, and a binding force exerted by a polar bond in the polyvinylidene fluoride onto the negative electrode can effectively mitigate the rebound rate of the negative electrode.

According to some embodiments of this application, the polymer binder includes at least one of polyvinylidene difluoride-co-hexafluoropropylene, polyvinylidene difluoride-co-trichloroethylene, polyimide, polymethyl methacrylate, polyacrylonitrile, and polyethylene glycol. In some embodiments, the polymer binder is polyvinylidene fluoride.

In some embodiments, based on the total weight of the coating, the weight percent of the polymer binder is approximately 1% to approximately 100%. In other embodiments, the weight percent of the polymer binder is approximately 50% to approximately 99%. In other embodiments, the weight percent of the polymer binder is approximately 80% to approximately 95%.

In some embodiments, the weight per unit area of the polymer binder of the coating is $1 \times 10^{-3}$ g/cm$^2$ to $5 \times 10^{-3}$ g/cm$^2$.

Using an example of a lithium-ion battery in which a silicon-based material is used as an active component, as shown in Table 1, within the range of 10%-100% being the weight percent of the active component of the negative active material layer, the compacted density of the corresponding negative active material layer is approximately 0.4545 g/cm$^2$ to approximately 0.7797 g/cm$^2$. The weight per unit area of the polyvinylidene fluoride in the coating of the separator is $1 \times 10^{-3}$ g/cm$^2$ to $5 \times 10^{-3}$ g/cm$^2$. The range of the ratio of the weight of the polyvinylidene fluoride per unit area to the specific capacity of the silicon-based material in the negative electrode is 0.00013 mg/mAh to approximately 0.00045 mg/mAh (as shown in Table 1).

mately 30 N/m. In other embodiments, roughly the adhesion force of the separator to the negative electrode is, for example, approximately 2 N/m, approximately 3 N/m, approximately 5 N/m, approximately 10 N/m, approximately 15 N/m, approximately 20 N/m, approximately 25 N/m, approximately 30 N/m, or a range formed by any two of such values.

Separator and Separator Coating

According to some embodiments of this application, the surface of the polymer-coated separator (PCS) may be modified, or the porosity and the thickness may be improved, or a functional coating may be added to enhance properties such as electrolyte infiltration and mechanical strength of the separator.

In some embodiments, the separator includes one or more of a polymer coated separator (PCS) and a ceramic-coated separator (CCS). A technical process of the polymer-coated separator (PCS) and the ceramic-coated separator (CCS) is: first, applying a ceramic-coated separator coating to a surface of the porous substrate of the separator facing the positive electrode, where the ceramic-coated separator coating improves contraction of the polymer separator, enhances penetration resistance, provides sufficient infiltration, prolongs the service life of the battery, and reduces purple specks on the electrode plate; subsequently, applying a polymer separator coating to a single surface or both surfaces of the separator. As shown in FIG. 2, the separator 10 may further include an inorganic coating 103. The inorganic coating 103 is disposed on the other surface opposite to the foregoing coating.

In some embodiments, the inorganic coating includes inorganic particles, and the inorganic particles include at least one of $SrTiO_3$, $SnO_2$, $CeO_2$, MgO, NiO, CaO, ZnO, $ZrO_2$, $Y_2O_3$, $Al_2O_3$, $TiO_2$, and SiC.

TABLE 1

| Design parameter | Weight of polyvinylidene fluoride per unit area (mg/mm$^2$) | Compacted density of negative active material layer (g/cm$^2$) | Specific capacity of negative active material layer (mAh/mg) | Specific capacity per unit area of active component (mAh/mm$^2$) | Ratio of weight of applied polyvinylidene fluoride per unit area to specific capacity (mg/mAh) |
|---|---|---|---|---|---|
| Range | $1 \times 10^{-4}$-$5 \times 10^{-4}$ | 0.4545-0.7797 | 1.6 | 0.726-1.248 | 0.00013-0.00045 |

In some embodiments, the ratio of the weight (mg/mm$^2$) of the applied polymer binder per unit area to the specific capacity (mAh/mm$^2$) of the active component of the negative electrode per unit area is approximately 0.00013 mg/mAh to approximately 0.00045 mg/mAh. In other embodiments, the ratio (mg/mAh) of the weight of the polymer binder in the coating per unit area to the specific capacity of the corresponding active component in the negative electrode per unit area is, for example, approximately 0.00013 mg/mAh, approximately 0.00015 mg/mAh, approximately 0.0002 mg/mAh, approximately 0.00025 mg/mAh, approximately 0.0003 mg/mAh, approximately 0.00035 mg/mAh, approximately 0.0004 mg/mAh, approximately 0.00045 mg/mAh, or a range formed by any two of such values. In other embodiments, the ratio of the weight (mg/mm$^2$) of the applied polymer binder per unit area to the specific capacity (mAh/mm$^2$) of the negative electrode per unit area is approximately 0.0002 mg/mAh to approximately 0.00035 mg/mAh.

In some embodiments, the adhesion force of the separator to the negative electrode is approximately 2 N/m to approxi- In some embodiments, based on a total weight of the inorganic coating, a weight percent of the inorganic particles is 1-100%. In other embodiments, roughly the weight percent of the inorganic particles is, for example, approximately 1%, approximately 10%, approximately 20%, approximately 40%, approximately 60%, approximately 80%, approximately 100%, or a range formed by any two of such values.

In some embodiments, a thickness of the inorganic coating is approximately 0.5 µm to approximately 5.0 µm. In other embodiments, roughly the thickness of the inorganic coating is, for example, approximately 0.5 µm, approximately 1.0 µm, approximately 1.5 µm, approximately 2.0 µm, approximately 3.0 µm, approximately 4.0 µm, approximately 5.0 µm, or a range formed by any two of such values.

In some embodiments, a coverage of the inorganic coating on a second surface of the porous substrate is approximately 1% to approximately 90%.

Understandably, without departing from the spirit of this application, a person skilled in the art may add, replace, or remove the inorganic coating according to actual requirements, or even add a third coating or a fourth coating without limitation.

In some embodiments, the porous substrate of the polymer separator in this application includes, but is not limited to, at least one of polyolefin, polyamide, polyimide, polyester, and aramid fiber. In some embodiments, the porous substrate of the polymer separator in this application includes one or more polymers in polyolefin. In some embodiments, the porous substrate includes, but is not limited to, at least one of polyethylene, polypropylene, polyethylene terephthalate, polyvinyl chloride, polyimide, and aramid fiber. In other embodiments, the porous substrate includes one or more of polyethylene and polypropylene. For example, the polyethylene includes a component selected from at least one of high-density polyethylene, low-density polyethylene, and ultra-high-molecular-weight polyethylene. Especially the polyethylene and the polypropylene are highly effective in preventing short circuits, and improve stability of the battery through a shutdown effect.

In some embodiments, the thickness of the porous substrate is approximately 0.5 to 5.0 μm, exemplarily, 1.0-4.0 μm, and desirably, 2.5-3.5 μm.

In some embodiments, the porosity of the porous substrate is 20%-80%, exemplarily, 30%-70%, and desirably 40%-60%. In some embodiments, the pore size range is approximately 10 nm to 100 nm, exemplarily, 40 nm to 80 nm, and desirably, 50 nm to 70 nm.

As shown in FIG. 2, the electrochemical device according to this application further includes a positive electrode 30. The positive electrode 30 includes a positive current collector 301 and a positive active material layer 302. In some embodiments, the positive current collector 301 may be an aluminum foil or a nickel foil. However, other materials commonly used in the art may be used as the positive current collector without limitation.

The positive active material layer 302 includes a positive electrode material capable of absorbing and releasing lithium (Li) (hereinafter sometimes referred to as "positive electrode material capable of absorbing/releasing lithium Li"). In some embodiments, the positive electrode materials capable of absorbing/releasing lithium (Li) may include one or more of lithium cobalt oxide, lithium nickel cobalt manganese oxide, lithium nickel cobalt aluminum oxide, lithium manganese oxide, lithium iron manganese phosphate, lithium vanadium phosphate, lithium vanadyl phosphate, lithium iron phosphate, lithium titanium oxide, and a lithium-rich manganese-based materials.

In the foregoing positive electrode materials, the chemical formula of the lithium cobalt oxide may be $Li_yCo_aM1_bO_{2-c}$, where M1 is selected from at least one of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr), and silicon (Si), and values of y, a, b, and c are in the following ranges: $0.8 \leq y \leq 1.2$, $0.8 \leq a \leq 1$, $0 \leq b \leq 0.2$, $-0.1 \leq c \leq 0.2$, respectively.

In the foregoing positive electrode materials, the chemical formula of the lithium nickel cobalt manganese oxide or the lithium nickel cobalt aluminum oxide may be $Li_zNi_dM2_e$ $O_{2-f}$, where M2 is selected from at least one of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), zirconium (Zr), and silicon (Si), and values of z, d, e, and f are in the following ranges: $0.8 \leq z \leq 1.2$, $0.3 \leq d \leq 0.98$, $0.02 \leq e \leq 0.7$, $-0.1 \leq f \leq 0.2$, respectively.

In the foregoing positive electrode materials, the chemical formula of lithium manganese oxide is $Li_uMn_{2-g}M3_gO_{4-h}$, where M3 is selected from at least one of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), and values of z, g, and h are in the following ranges: $0.8 \leq u \leq 1.2$, $0 \leq g \leq 1.0$, and $-0.2 \leq h \leq 0.2$, respectively.

In some embodiments, the positive electrode may further include at least one of a binder and a conductive agent. Understandably, a person skilled in the art may select a conventional binder and a conventional conductive agent according actual requirements without limitation.

The electrochemical device according to this application further includes an electrolyte. The electrolyte may be one or more of a gel electrolyte, a solid-state electrolyte, and an electrolytic solution. The electrolytic solution includes a lithium salt and a nonaqueous solvent.

In some embodiments, the lithium salt is selected from one or more of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, and lithium difluoroborate. For example, the lithium salt is $LiPF_6$ because it provides a high ionic conductivity and improves cycle characteristics.

The nonaqueous solvent may be a carbonate compound, a carboxylate compound, an ether compound, another organic solvent, or any combination thereof.

The carbonate compound may be a chain carbonate compound, a cyclic carbonate compound, a fluorocarbonate compound, or any combination thereof.

Examples of the other organic solvent are dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate ester, and any combination thereof.

In some embodiments, the nonaqueous solvent is selected from groups that each include ethylene carbonate, propylene carbonate, diethyl carbonate, dimethyl carbonate, ethyl methyl carbonate, propylene carbonate, methyl acetate, ethyl propionate, fluoroethylene carbonate, and any combination thereof.

Understandably, without departing from the spirit of this application, the method for preparing the negative electrode, the positive electrode, the separator, and the electrochemical device in the embodiments of this application may be, but without limitation, any appropriate conventional method in the art selected according to specific requirements. In an implementation of the method for manufacturing an electrochemical device, the method for preparing a lithium-ion battery includes: winding, folding, or stacking the negative electrode, the separator, the positive electrode in the foregoing embodiments sequentially into an electrode assembly; putting the electrode assembly into, for example, an aluminum laminated film, and injecting an electrolytic solution; and then performing steps such as vacuum packaging, static standing, formation, and reshaping to obtain a lithium-ion battery.

Although the lithium-ion battery is used as an example for description above, a person skilled in the art after reading this application can learn that the negative electrode in this application is applicable to other suitable electrochemical devices. Such electrochemical devices include any device in which an electrochemical reaction occurs. Specific examples of the devices include all kinds of primary batteries, secondary batteries, fuel batteries, solar batteries, or capacitors. In particular, the electrochemical apparatus is a lithium secondary battery, including a lithium metal secondary battery, a lithium-ion secondary battery, a lithium polymer secondary battery, or a lithium-ion polymer secondary battery.

Some embodiments of this application further provide an electronic device. The electronic device includes the electrochemical device in the embodiments of this application.

The electronic device configured to include the electrochemical device in the embodiments of this application may be any electronic device in the prior art without being specifically limited. In some embodiments, the electronic device may include, but is not limited to, a notebook computer, a pen-inputting computer, a mobile computer, an e-book player, a portable phone, a portable fax machine, a portable photocopier, a portable printer, a stereo headset, a video recorder, a liquid crystal display television set, a handheld cleaner, a portable CD player, a mini CD-ROM, a transceiver, an electronic notepad, a calculator, a memory card, a portable voice recorder, a radio, a backup power supply, a motor, a car, a motorcycle, a power-assisted bicycle, a bicycle, a lighting appliance, a toy, a game machine, a watch, an electric tool, a flashlight, a camera, a large household battery, a lithium-ion capacitor, and the like.

EMBODIMENTS

To better illustrate the technical solutions of this application, the following enumerates some specific embodiments, compares the impact caused by different polymer binders in the separator coating onto the negative electrode, compares differences between the polymer binder (polyvinylidene fluoride) added into the separator coating and the polymer binder added into the negative electrode, and compares impact caused onto an expansion rate by the range of the ratio of different weights of the applied binder per unit area to the specific capacity of the negative electrode per unit area.

I. Test Methods 1.1 Method for Testing Interfacial Adhesion of the Separator

Disassembling a cell of a lithium-ion battery at an interface between a positive electrode and a separator in a dry room, and leaving the cell to stand for 5 minutes until an electrolytic solution is evaporated and dry; cutting out a 100 mm×25 mm piece from an interface between a negative electrode and the separator; using a GoTech tensile strength testing machine (TS-2000, Shanghai Microcre Light-Machine Tech Co., Ltd.) to test an adhesion force of the interface by setting a tensile speed to 5 mm/min and setting a tensile displacement to 50 mm; testing 4 lithium-ion batteries for each group that are prepared in the following embodiments, and calculating an average adhesion force of the interface between the negative electrode and the separator of the lithium-ion batteries.

1.2 Cycle Performance Test

Charging a lithium-ion battery in the embodiments at a temperature of 25° C. and a constant current of 0.5 C until the voltage reaches 4.35 V; further charging the battery at a constant voltage of 4.35 V until the current reaches 0.05 C, and discharging the lithium-ion battery at a constant current of 0.5 C until the voltage reaches 3.0 V, thereby completing one charge and discharge cycle; recording a first-cycle discharge capacity of the lithium-ion battery; and then performing the charge and discharge cycles repeatedly according to the foregoing method, and recording a discharge capacity after 200 cycles; testing 4 lithium-ion batteries for each group that are prepared in the following embodiments, and calculating a cycle capacity retention rate of the lithium-ion batteries: cycle capacity retention rate of the lithium-ion batteries=(the discharge capacity (mAh) after the 200th cycle/the discharge capacity (mAh) after the first cycle×100%.

1.3 Test of a Cycle Expansion Rate

Using a 600 g tablet thickness gauge (ELASTOCON, EV 01) to test a thickness of a lithium-ion battery in a fully charged state at the first cycle of the lithium-ion battery prepared in the embodiments, and a thickness in the fully charged state at the $200^{th}$ cycle: cycle thickness expansion rate of the lithium-ion battery=thickness of the fully charged battery at the $200^{th}$ cycle/thickness of the battery fully charged for the first time.

II. Preparation Methods 2.1 Preparing a Positive Electrode

Mixing lithium cobalt oxide, acetylene black, and polyvinylidene fluoride at a mass ratio of 94:3:3, and dissolving the mixture in an N-methylpyrrolidone (NMP) solution to form a positive electrode slurry; and using an aluminum foil as a positive current collector, coating the positive electrode slurry onto the positive current collector; and performing drying, cold calendering, and cutting steps to obtain a positive electrode.

2.2 Preparing a Negative Electrode

Using a silicon-carbon hybrid as an active component, mixing graphite, the silicon-carbon hybrid, and styrene butadiene rubber (SBR) at a weight ratio of 88:7:5, and dissolving the mixture in deionized water to form a negative electrode slurry, where the negative electrode slurry further includes or does not include the binder described in some of the following embodiments; and using a copper foil as a negative current collector, coating the negative electrode slurry onto the negative current collector, and performing steps such as drying, cold calendering, and cutting to obtain a silicon-carbon negative electrode.

2.3 Preparing an Electrolytic Solution

In an environment with a water content of less than 10 ppm, mixing lithium hexafluorophosphate, fluoroethylene carbonate (FEC), and a nonaqueous organic solvent (at a weight ratio of ethylene carbonate (EC):dimethyl carbonate (DMC):diethyl carbonate (DEC)=1:1:1) to prepare an electrolytic solution with an FEC weight percent of 10 wt % and a lithium hexafluorophosphate concentration of 1 mol/L.

2.4 Preparing a Lithium-Ion Battery

Stacking the foregoing positive electrode, the separator provided in the following embodiments, and the foregoing negative electrode sequentially, placing the separator between the positive electrode and the negative electrode to serve a separation function, and then winding them into an electrode assembly; putting the electrode assembly into an aluminum laminated film packaging bag, and performing drying at 80° C. to obtain a dry electrode assembly; and injecting the electrolytic solution into the dry electrode assembly, and performing steps such as vacuum packaging, static standing, formation, and reshaping to complete preparing the lithium-ion batteries disclosed in the following embodiments. The size of the lithium-ion battery is approximately 3.2 mm in thickness, 35 mm in width, and 92 mm in length.

III: Preparations in Embodiments

Embodiment 1

First, using polyethylene as a porous substrate of a separator, where a porosity of the porous substrate is 45%; coating inorganic particles (an inorganic coating) onto a surface of the porous substrate, where the surface is a surface facing a positive electrode, and the inorganic particles are aluminum oxide ($Al_2O_3$) particles, so as to form a ceramic-coated separator;

then, using polyvinylidene fluoride (PVDF) as a polymer binder; mixing the binder with the aluminum oxide ($Al_2O_3$) particles form a mixed slurry; coating the mixed slurry onto an surface of the porous substrate to form a polymer coating (coating), where the surface is a surface facing a negative electrode, a ratio of the weight of the applied polyvinylidene fluoride per unit area to a specific capacity of a silicon-carbon hybrid of the negative electrode per unit area is 0.00008 mg/mAh, a weight percent of the polymer binder in the coating is 60%, and a porosity of the polymer coating (coating) is 20%; and also applying the polymer coating onto a surface of the ceramic-coating separator, where the surface is a surface facing the positive electrode; performing drying to form a separator, where the thickness of the coating is 1.5 μm, and a coverage of the coating on a first surface of the porous substrate of the separator is 40%, with the first surface facing the negative electrode, as detailed in Table 2 and Table 3.

Embodiments 2-14

The preparation method is the same as that in Embodiment 1, but differences are: in Embodiments 2-14, the ratio of the weight of the applied polyvinylidene fluoride per unit area to the specific capacity of the silicon-carbon hybrid of the negative electrode per unit area is changed, as detailed in Table 2 and Table 3.

Embodiments 15 and 16

The preparation method is the same as that in Embodiment 1, but differences are: in Embodiments 15 and 16, the weight percent of polyvinylidene fluoride in the coatings is 80% and 20%, respectively, and the thickness of the coating is 2 μm and 0.5 μm, respectively, as detailed in Table 2 and Table 3.

Embodiments 17 and 18

The preparation method is the same as that in Embodiment 1, but differences are: in Embodiments 17 and 18, the porosity of the coating is 40% and 80%, respectively, and the thickness of the coating is 3 μm and 7 μm, respectively, as detailed in Table 2 and Table 3.

Embodiments 19-22

The preparation method is the same as that in Embodiment 1, but differences are: in Embodiments 19-22, the coverage of the coating on a first surface of the porous substrate is different, with the first surface facing the negative electrode, as detailed in Table 2 and Table 3.

Embodiments 23 and 24

The preparation method is the same as that in Embodiment 1, but differences are: in Embodiments 23 and 24, the inorganic particles are Magnesium oxide (MgO) particles and calcium oxide (CaO) particles, respectively, as detailed in Table 2 and Table 3.

Embodiments 25 and 26

The preparation method is the same as that in Embodiment 10, but differences are: in Embodiments 25 and 26, the porous substrate is polypropylene and polyimide, respectively, as detailed in Table 2 and Table 3.

Embodiments 27 and 28

The preparation method is the same as that in Embodiment 10, but differences are: in Embodiments 27 and 28, the porosity of the porous substrate is 70% and 20%, respectively, as detailed in Table 2 and Table 3.

Embodiments 29-37

The preparation method is the same as that in Embodiment 5, but differences are: in Embodiments 29-37, the polymer binder of the coating is different. For specific types of the polymer binders, refer to Table 2 and Table 3.

Embodiments 38-42

The preparation method is the same as that in Embodiment 1, but differences are: in Embodiments 38-42, the separator is a ceramic-coated separator, without forming a coating that contains a polymer binder, and the polymer binder originally added to the coating is added to the negative electrode slurry instead; the polymer binder is polyvinylidene fluoride (Embodiments 38-41) or polyacrylic acid (Embodiment 42); and the ratio of the weight of the applied polymer binder per unit area to the specific capacity of the silicon carbon hybrid of the negative electrode per unit area is 0.00015 mg/mAh, 0.00020 mg/mAh, 0.00025 mg/mAh, 0 mg/mAh, and 0.00020 mg/mAh, respectively, as detailed in Table 2 and Table 3.

An interfacial adhesion test of the separator is performed on the negative electrode and the separator provided in the foregoing embodiments. Subsequently, a cycle performance test, a cycle expansion rate test are performed on the lithium-ion battery, and test results are recorded.

Statistical values of the separator and the negative electrode provided in Embodiments 1-42 are shown in Table 2 below.

TABLE 2

| Embodiment/ Comparative Embodiment | Type of polymer binder in the coating | Coating Porosity | Coating thickness (μm) | Coating Weight percent of polymer binder | Coating Coverage on porous substrate | Porous substrate type | Porous substrate porosity | Inorganic coating Type of inorganic particles |
|---|---|---|---|---|---|---|---|---|
| Embodiment 1 | PVDF | 20% | 1.5 | 60% | 40% | Polyethylene | 45% | $Al_2O_3$ |
| Embodiment 2 | PVDF | 20% | 1.5 | 60% | 40% | Polyethylene | 45% | $Al_2O_3$ |
| Embodiment 3 | PVDF | 20% | 1.5 | 60% | 40% | Polyethylene | 45% | $Al_2O_3$ |
| Embodiment 4 | PVDF | 20% | 1.5 | 60% | 40% | Polyethylene | 45% | $Al_2O_3$ |
| Embodiment 5 | PVDF | 20% | 1.5 | 60% | 40% | Polyethylene | 45% | $Al_2O_3$ |
| Embodiment 6 | PVDF | 20% | 1.5 | 60% | 40% | Polyethylene | 45% | $Al_2O_3$ |
| Embodiment 7 | PVDF | 20% | 1.5 | 60% | 40% | Polyethylene | 45% | $Al_2O_3$ |
| Embodiment 8 | PVDF | 20% | 1.5 | 60% | 40% | Polyethylene | 45% | $Al_2O_3$ |
| Embodiment 9 | PVDF | 20% | 1.5 | 60% | 40% | Polyethylene | 45% | $Al_2O_3$ |
| Embodiment 10 | PVDF | 20% | 1.5 | 60% | 40% | Polyethylene | 45% | $Al_2O_3$ |
| Embodiment 11 | PVDF | 20% | 1.5 | 60% | 40% | Polyethylene | 45% | $Al_2O_3$ |
| Embodiment 12 | PVDF | 20% | 1.5 | 60% | 40% | Polyethylene | 45% | $Al_2O_3$ |
| Embodiment 13 | PVDF | 20% | 1.5 | 60% | 40% | Polyethylene | 45% | $Al_2O_3$ |
| Embodiment 14 | PVDF | 20% | 1.5 | 60% | 40% | Polyethylene | 45% | $Al_2O_3$ |
| Embodiment 15 | PVDF | 40% | 3 | 60% | 40% | Polyethylene | 45% | $Al_2O_3$ |
| Embodiment 16 | PVDF | 80% | 7 | 60% | 40% | Polyethylene | 45% | $Al_2O_3$ |
| Embodiment 17 | PVDF | 20% | 2 | 80% | 40% | Polyethylene | 45% | $Al_2O_3$ |
| Embodiment 18 | PVDF | 20% | 0.5 | 20% | 40% | Polyethylene | 45% | $Al_2O_3$ |
| Embodiment 19 | PVDF | 20% | 1.5 | 60% | 20% | Polyethylene | 45% | $Al_2O_3$ |
| Embodiment 20 | PVDF | 20% | 1.5 | 60% | 60% | Polyethylene | 45% | $Al_2O_3$ |
| Embodiment 21 | PVDF | 20% | 1.5 | 60% | 80% | Polyethylene | 45% | $Al_2O_3$ |
| Embodiment 22 | PVDF | 20% | 12 | 85% | 95% | Polyethylene | 45% | $Al_2O_3$ |
| Embodiment 23 | PVDF | 20% | 1.5 | 60% | 40% | Polyethylene | 45% | MgO |
| Embodiment 24 | PVDF | 20% | 1.5 | 60% | 40% | Polyethylene | 45% | CaO |
| Embodiment 25 | PVDF | 20% | 1.5 | 60% | 40% | Polypropylene | 45% | $Al_2O_3$ |
| Embodiment 26 | PVDF | 20% | 1.5 | 60% | 40% | Polyimide | 45% | $Al_2O_3$ |
| Embodiment 27 | PVDF | 20% | 1.5 | 60% | 40% | Polyethylene | 70% | $Al_2O_3$ |
| Embodiment 28 | PVDF | 20% | 1.5 | 60% | 40% | Polyethylene | 20% | $Al_2O_3$ |
| Embodiment 29 | PVA | 20% | 1.5 | 60% | 40% | Polyethylene | 45% | $Al_2O_3$ |
| Embodiment 30 | PAA | 20% | 1.5 | 60% | 40% | Polyethylene | 45% | $Al_2O_3$ |
| Embodiment 31 | SBR | 20% | 1.5 | 60% | 40% | Polyethylene | 45% | $Al_2O_3$ |
| Embodiment 32 | PAN | 20% | 1.5 | 60% | 40% | Polyethylene | 45% | $Al_2O_3$ |
| Embodiment 33 | CMC | 20% | 1.5 | 60% | 40% | Polyethylene | 45% | $Al_2O_3$ |
| Embodiment 34 | Polyvinyl ether | 20% | 1.5 | 60% | 40% | Polyethylene | 45% | $Al_2O_3$ |
| Embodiment 35 | PTFE | 20% | 1.5 | 60% | 40% | Polyethylene | 45% | $Al_2O_3$ |
| Embodiment 36 | Polyacrylic ester | 20% | 1.5 | 60% | 40% | Polyethylene | 45% | $Al_2O_3$ |
| Embodiment 37 | PI | 20% | 1.5 | 60% | 40% | Polyethylene | 45% | $Al_2O_3$ |
| Embodiment 38 | — | — | — | — | — | Polyethylene | 45% | $Al_2O_3$ |
| Embodiment 39 | — | — | — | — | — | Polyethylene | 45% | $Al_2O_3$ |
| Embodiment 40 | — | — | — | — | — | Polyethylene | 45% | $Al_2O_3$ |
| Embodiment 41 | — | — | — | — | — | Polyethylene | 45% | $Al_2O_3$ |
| Embodiment 42 | — | — | — | — | — | Polyethylene | 45% | $Al_2O_3$ |

Table 3 shows test results of the ratio of the weight of the applied polymer binder per unit area in Embodiments 1-42 to the specific capacity of the silicon-carbon hybrid of the negative electrode per unit area, the interfacial adhesion of the separator and the negative electrode, and the cycle performance and the cycle expansion rate of the lithium-ion battery.

TABLE 3

| Embodiment/ Comparative Embodiment | Ratio of weight of applied polymer binder per unit area to specific capacity of silicon-carbon hybrid of negative electrode (% mg/mAh) | Adhesion of separator to negative electrode (N/m) | Cycle capacity retention rate | Cycle thickness expansion rate |
|---|---|---|---|---|
| Embodiment 1 | 0.008 | 1.8-2.2 | 78.50% | 11.80% |
| Embodiment 2 | 0.012 | 3.4-4.9 | 79.40% | 11.50% |
| Embodiment 3 | 0.048 | 14.5-15.4 | 78.10% | 11% |
| Embodiment 4 | 0.05 | 15.2-16.8 | 77.50% | 10.20% |
| Embodiment 5 | 0.03 | 9.5-10.4 | 89.50% | 7.20% |
| Embodiment 6 | 0.015 | 4.6-5.8 | 87.20% | 9.30% |
| Embodiment 7 | 0.02 | 6.6-7.0 | 88.90% | 9% |
| Embodiment 8 | 0.025 | 7.6-8.5 | 89.50% | 8.30% |
| Embodiment 9 | 0.029 | 9.5-10.1 | 92.30% | 5.60% |

TABLE 3-continued

| Embodiment/ Comparative Embodiment | Ratio of weight of applied polymer binder per unit area to specific capacity of silicon-carbon hybrid of negative electrode (% mg/mAh) | Adhesion of separator to negative electrode (N/m) | Cycle capacity retention rate | Cycle thickness expansion rate |
|---|---|---|---|---|
| Embodiment 10 | 0.033 | 10.2-11.0 | 91.70% | 6.30% |
| Embodiment 11 | 0.037 | 11.2-11.8 | 89.90% | 6.80% |
| Embodiment 12 | 0.04 | 11.5-12.2 | 90% | 7.20% |
| Embodiment 13 | 0.042 | 12.3-12.9 | 88.70% | 7.30% |
| Embodiment 14 | 0.045 | 12.9-13.6 | 88.90% | 7.60% |
| Embodiment 15 | 0.008 | 2.0-2.4 | 78.30% | 11.30% |
| Embodiment 16 | 0.008 | 2.2-2.6 | 78.40% | 11.20% |
| Embodiment 17 | 0.008 | 2.1-2.5 | 78.50% | 10.80% |
| Embodiment 18 | 0.008 | 1.7-2.1 | 78.60% | 11.80% |
| Embodiment 19 | 0.005 | 1.6-1.8 | 77.80% | 11.90% |
| Embodiment 20 | 0.01 | 2.5-2.9 | 78.90% | 10.50% |
| Embodiment 21 | 0.014 | 3.0-3.4 | 78.70% | 10.30% |
| Embodiment 22 | 0.12 | 30 | 20.00% | 11.80% |
| Embodiment 23 | 0.008 | 1.8-2.2 | 78.20% | 11.40% |
| Embodiment 24 | 0.008 | 1.9-2.3 | 78.50% | 11.10% |
| Embodiment 25 | 0.033 | 10.4-11.2 | 91.50% | 6.10% |
| Embodiment 26 | 0.033 | 10.1-10.9 | 91.40% | 6.20% |
| Embodiment 27 | 0.033 | 9.8-10.8 | 88.00% | 7.30% |
| Embodiment 28 | 0.033 | 9.9-11.2 | 79.00% | 6.80% |

TABLE 3-continued

| Embodiment/ Comparative Embodiment | Ratio of weight of applied polymer binder per unit area to specific capacity of silicon-carbon hybrid of negative electrode (% mg/mAh) | Adhesion of separator to negative electrode (N/m) | Cycle capacity retention rate | Cycle thickness expansion rate |
|---|---|---|---|---|
| Embodiment 29 | 0.03 | 1-1.8 | 75% | 13.20% |
| Embodiment 30 | 0.03 | 2-2.5 | 74% | 12.10% |
| Embodiment 31 | 0.03 | 1.0-2.0 | 72% | 11.80% |
| Embodiment 32 | 0.03 | 2-2.5 | 73% | 13.50% |
| Embodiment 33 | 0.03 | 3-3.4 | 71% | 12.30% |
| Embodiment 34 | 0.03 | 1-1.8 | 70% | 11.80% |
| Embodiment 35 | 0.03 | 2-2.9 | 72% | 13.20% |
| Embodiment 36 | 0.03 | 1.5-3.2 | 71% | 12.60% |
| Embodiment 37 | 0.03 | 5.2-6.4 | 82% | 10.10% |
| Embodiment 38 | 0.015 | 1-1.5 | 70% | 12.70% |
| Embodiment 39 | 0.02 | 2-2.5 | 75% | 12.20% |
| Embodiment 40 | 0.025 | 3-3.2 | 76% | 12% |
| Embodiment 41 | — | 0-0.1 | 68.00% | 15.00% |
| Embodiment 42 | 0.02 | 0-0.1 | 66.00% | 15.00% |

IV. Description of Embodiments in Groups

It is found in this application that, when the ratio of the weight of the applied polyvinylidene fluoride in the coating per unit area to the specific capacity of the corresponding component in the negative electrode per unit area is in the range of approximately 0.00013 mg/mAh to approximately 0.00045 mg/mAh, the separator can achieve an interfacial adhesion of at least 2.0 N/m to the negative electrode. In Embodiments 9-14, the interfacial adhesion of the separator to the negative electrode is up to 10.0 N/m or more. Therefore, the negative electrode can be bonded effectively and the expansion of the negative electrode can be suppressed. In addition, when the ratio of the weight of the applied polyvinylidene fluoride in the coating of the separator per unit area to the specific capacity of the corresponding component in the negative electrode per unit area is in the range of approximately 0.00013 mg/mAh to approximately 0.00045 mg/mAh, the volume expansion of the negative electrode can be reduced by at least 40%. For example, the cell deformation caused by the volume expansion of the negative electrode during charging and discharging can be reduced from 15% to 3%. In addition, because the interface of the separator facing the negative electrode keeps stable, the cycle attenuation of the specific capacity of the lithium-ion battery can be slowed down. The lithium-ion battery in Embodiments 5-14 can achieve a cycle capacity retention rate of nearly 90%.

4.1 Embodiments 5 and 29-37 Illustrate the Impact Caused by Different Polymer Binders onto the Negative Electrode Polyacrylic alcohol (PVA), polyacrylic acid (PAA), styrene butadiene rubber (SBR), polyacrylonitrile (PAN), sodium carboxymethyl cellulose (CMC), and polyvinyl ether are binders commonly used in the negative electrode slurry.

Polytetrafluoroethylene (PTFE) is generally called "nonstick coating" or "easily cleanable material". This material is resistant to acids, alkalis, and various organic solvents, and is almost insoluble in all solvents.

Polyacrylic ester is easily soluble in acetone, ethyl acetate, benzene, and dichloroethane, but insoluble in water. It can form a glossy and water-resistant film that adheres firmly and does not peel off easily, and that is flexible and elastic at a room temperature, and is of high weather resistance but not high tensile strength. Polyacrylic ester is adhesive and can be used as a pressure-sensitive adhesive and a thermosensitive adhesive. Polyacrylic ester is convenient to use due to its high resistance to aging and low adhesion pollution.

Polyimide (PI) and polyvinylidene fluoride (PVDF) are suitable for greasy separator coatings.

As shown in Tables 2 and 3, as can be learned from comparison between Embodiments 5 and 29-37, when polyvinylidene fluoride and polyimide are used as polymer binders in the coatings, the separator can maintain adhesion to the negative electrode to some extent, and can increase the cycle capacity retention rate and reduce the cycle thickness expansion rate of the lithium-ion battery, and lead to high cycle performance of the lithium-ion battery. When the polyvinylidene fluoride is used as a polymer binder in the coating, the lithium-ion battery can achieve the best cycle performance.

4.2 Embodiment 6 Illustrates Differences Between the Polymer Binder Added in the Coating and the Polymer Binder Added in the Negative Electrode As can be learned from comparison between Embodiment 6 and Embodiments 38-42, in contrast with a circumstance in which the polymer binder is added in the negative electrode in proportion to the active component of the negative electrode in the range disclosed in the embodiments of this application, the practice of disposing the polymer binder into the coating added to the separator can greatly increase the adhesion of the separator of the separator to the negative electrode to a higher extent, thereby increasing the cycle capacity retention rate and reducing the cycle expansion rate of the lithium-ion battery.

Specifically, with the same weight of the polymer binder added per unit area, the cycle retention rate of the lithium-ion battery is up to 87.2% and the cycle expansion rate is 9.3% according to Embodiment 6 of this application. In contrast, in Embodiment 38 in which the polymer binder is added into the negative electrode, the cycle retention rate of the lithium-ion battery is merely 70.0% and the cycle expansion rate is as high as 12.7%. If the polymer binder is not added at all, as revealed in Embodiment 41, the cycle retention rate of the lithium-ion battery is as low as 68.0%, and the cycle expansion rate is as high as 15%, and serious deformation occurs during cycling.

4.3 Embodiments 1-14 Illustrate the Impact Caused by Different Weights of the Applied Binder Per Unit Area onto the Expansion Rate As shown in Table 3, as can be learned from comparison of Embodiments 1-14, a higher ratio of the weight of the applied polymer binder in the coating per unit area to the specific capacity of the active component (silicon-carbon hybrid) in the negative electrode per unit area (the ratio is hereinafter referred to a K value) leads to stronger adhesion of the separator to the negative electrode.

When the K value is lower than the lower limit 0.00013 mg/mAh, the weight of the applied polyvinylidene fluoride in the separator is too small, the adhesion between the separator and the negative electrode is too weak, and the functional coating is futile and not helpful for mitigating the expansion of the negative electrode. When the ratio of the weight of the applied polyvinylidene fluoride per unit area to the specific capacity per unit area, that is, the PVDF/Si ratio, exceeds the upper limit 0.00045 mg/mAh, there is too much binder in the coating, and the internal pores of the porous substrate of the separator are fully covered by polyvinylidene fluoride. Consequently, in the process of close contact between the separator and the negative electrode, ions can hardly penetrate the separator, kinetics are insufficient, and the lithium-ion battery cannot be formed, thereby severely affecting the cycle stability.

Embodiments 1-2 illustrate low K values (0.00008 mg/mAh-0.00012 mg/mAh), and Embodiments 6-4 illustrate gradually increased K values in the separator (0.00015 mg/mAh-0.00045 mg/mAh), indicating that the increase the ratio of the PVDF/Si ratio significantly improves the expansion of the negative electrode. The negative electrode with the same weight of evenly applied coating is selected to calculate the adhesion value. As can be learned from Embodiments 6-9, when the K value increases from 0.00015 mg/mAh to 0.00029 mg/mAh, the expansion rate of the cycle thickness decreases from 9.3% to 5.6%, indicating that the polyvinylidene fluoride can mitigate the expansion of the cycle thickness. As can be seen from Embodiments 5-14, the separators are highly adhesive to the negative electrode (the adhesion is greater than 5 N/m, or even greater than 10 N/m), and can firmly bind the layers of the battery during the binding of the battery, thereby effectively suppressing great expansion of the silicon negative electrode. When the PVDF/Si ratio is approximately 0.00030 mg/mAh (Embodiment 5), the expansion of the negative electrode is mitigated to the greatest extent, and the solution is the best. In addition, due to the suppression of expansion and deformation, the interface between the negative electrode and the separator is better, and the cycle capacity retention rate is higher.

4.4 Embodiments 1 and 15-22 Illustrate the Impact Caused by the Parameters of the Coating Structure As shown in Tables 2 and 3, Embodiments 1 and 15-18 illustrate the coatings that have different porosities, thicknesses, and weights of the polymer binder. From comparison of the adhesion of the binder, the cycle capacity retention rate, and the cycle thickness expansion rate of the lithium-ion batteries, it can be learned that the coatings with the porosity, thickness, and the weight of the polymer binder falling within the range specified in the embodiments of this application do not cause too much impact on the cycle performance of the lithium-ion battery.

In addition, as can be learned from comparison between Embodiment 1 and Embodiments 20-22, when the coverage of the coating on the porous substrate is in the range of 20% to 80%, if the K value of the coating remains the same, a higher coverage of the coating on the first surface of the porous substrate leads to stronger adhesion of the separator to the negative electrode, and leads to a lower cycle expansion rate of the lithium-ion battery. However, when the coverage rate is higher and a higher content of the polymer binder needs to be added, the K value of the coating will increase. This leads to too strong adhesion of the separator to the negative electrode and closing of the ion channels of the porous substrate, thereby deteriorating the cycle performance of lithium-ion battery.

Through the comparison of the foregoing embodiments, it is clearly understandable that the separator according to this application significantly improves the cycle performance and safety performance of the electrochemical device by controlling the ratio of the weight of the applied binder (polyvinylidene fluoride) in the coating in the separator to the specific capacity of the active component of the negative electrode. In addition, the separator has high mechanical strength, high thermal stability, and good electrolyte infiltration, thereby increasing the service life of the electrochemical device and reducing purple specks on the negative electrode.

References to "embodiments", "some embodiments", "an embodiment", "another example", "example", "specific example" or "some examples" throughout the specification mean that at least one embodiment or example in this application includes specific features, structures, materials, or characteristics described in the embodiment(s) or example(s). Therefore, descriptions throughout the specification, which make references by using expressions such as "in some embodiments", "in an embodiment", "in one embodiment", "in another example", "in an example", "in a specific example", or "example", do not necessarily refer to the same embodiment or example in this application. In addition, specific features, structures, materials, or characteristics herein may be combined in one or more embodiments or examples in any appropriate manner.

Although illustrative embodiments have been demonstrated and described above, a person skilled in the art understands that the above embodiments shall not be construed as a limitation on this application, and changes, replacements, and modifications may be made to the embodiments without departing from the spirit, principles, and scope of this application.

What is claimed is:

1. An electrochemical device, comprising:
a positive electrode;
a negative electrode; and
a separator;
wherein the negative electrode comprises a negative active material, and the negative active material comprises a carbon material and an active component; the active component is at least one of simple substance, alloys or compounds of silicon; based on a total weight of the negative active material, a weight percentage of the active component being greater than or equal to 7% and less than 15%,
wherein the separator comprises a porous substrate and a coating, wherein the coating is located between the porous substrate and the negative electrode, and the coating comprises a polymer binder,
based on a total weight of the coating, a weight percentage of the polymer binder is 1%-100%, and a ratio of a weight of the polymer binder in the coating per unit area to a specific capacity of the active component of the negative electrode per unit area is 0.00015 mg/mAh-0.00045 mg/mAh,
the porous substrate includes at least one of polyolefin, polyamide, polyimide, polyester, or aramid fiber, and
the polymer binder comprises at least one of polyvinylidene fluoride, polyvinylidene difluoride-co-hexafluoropropylene, or polyvinylidene difluoride-co-trichloroethylene.

2. The electrochemical device according to claim 1, wherein a thickness of the coating is 0.5 μm-5 μm, a porosity of the coating is 20%-80%.

3. The electrochemical device according to claim 1, wherein a thickness of the porous substrate is in a range of 0.5 μm-5 μm.

4. The electrochemical device according to claim 1, wherein a porosity of the porous substrate is 20%-80%.

5. The electrochemical device according to claim 1, wherein the coating covers 20%-80% of the porous substrate.

6. The electrochemical device according to claim 1, wherein an adhesion force of the separator to the negative electrode is 2 N/m-30 N/m.

7. The electrochemical device according to claim 1, wherein the separator further comprises an inorganic coating, wherein the inorganic coating comprises inorganic particles, and the inorganic particles comprise at least one of $SrTiO_3$, $SnO_2$, $CeO_2$, MgO, NiO, CaO, ZnO, $ZrO_2$, $Y_2O_3$, $Al_2O_3$, $TiO_2$, and SiC.

8. The electrochemical device according to claim 7, wherein based on a total weight of the inorganic coating, a weight percentage of the inorganic particles is 1 wt %-100 wt %.

9. The electrochemical device according to claim 7, wherein the inorganic coating covers 1%-90% of the porous substrate.

10. The electrochemical device according to claim 7, wherein a thickness of the inorganic coating is 0.5 μm-5 μm.

11. The electrochemical device according to claim 1, wherein based on the total weight of the coating, the weight percent of the polymer binder is 20%-80%.

12. An electronic device, comprising an electrochemical device, the electrochemical device comprises:
a positive electrode;
a negative electrode, wherein the negative electrode comprises a negative active material, and the negative active material comprises a carbon material and an active component, which is at least one of simple substance, alloys or compounds of silicon, based on a total weight of the negative active material, a weight percentage of the active component being greater than or equal to 7% and less than 15%; and
a separator, wherein the separator comprises:
a porous substrate and a coating, wherein the coating is located between the porous substrate and the negative electrode, and the coating comprises a polymer binder, and
based on a total weight of the coating, a weight percentage of the polymer binder is 1%-100%, and a ratio of a weight of the polymer binder in the coating per unit area to a specific capacity of the active component of the negative electrode per unit area is 0.00015 mg/mAh-0.00045 mg/mAh,
the porous substrate includes at least one of polyolefin, polyamide, polyimide, polyester, or aramid fiber, and
the polymer binder comprises at least one of polyvinylidene fluoride, polyvinylidene difluoride-co-hexafluoropropylene, or polyvinylidene difluoride-co-trichloroethylene.

13. The electronic device according to claim 12, wherein a thickness of the coating is 0.5 μm-5 μm, a porosity of the coating is 20%-80%.

14. The electronic device according to claim 12, wherein a thickness range of the porous substrate is 0.5 μm-5 μm.

15. The electronic device according to claim 12, wherein a porosity of the porous substrate is 20%-80%.

16. The electronic device according to claim 12, wherein a coverage of the coating on a first surface of the porous substrate is 20%-80%.

17. The electronic device according to claim 12, wherein an adhesion force of the separator to the negative electrode is 2 N/m-30 N/m.

18. The electronic device according to claim 12, wherein the separator further comprises:
inorganic coating, wherein the inorganic coating comprises inorganic particles, and the inorganic particles comprise at least one of $SrTiO_3$, $SnO_2$, $CeO_2$, MgO, NiO, CaO, ZnO, $ZrO_2$, $Y_2O_3$, $Al_2O_3$, $TiO_2$, and SiC.

19. The electronic device according to claim 18, wherein a coverage of the inorganic coating on the porous substrate is 1%-90%.

20. The electronic device according to claim 18, wherein a thickness of the inorganic coating is 0.5 μm-5 μm.

* * * * *